United States Patent
Guinart et al.

(10) Patent No.: US 10,629,007 B2
(45) Date of Patent: Apr. 21, 2020

(54) METHOD OF LOCATING THE POSITION OF WHEELS OF AN AUTOMOTIVE VEHICLE

(71) Applicants: CONTINENTAL AUTOMOTIVE FRANCE, Toulouse (FR);
CONTINENTAL AUTOMOTIVE GMBH, Hannover (DE)

(72) Inventors: Nicolas Guinart, Toulouse (FR);
Jacques Delaire, Toulouse (FR);
Olivier Fudulea, Toulouse (FR)

(73) Assignees: CONTINENTAL AUTOMOTIVE FRANCE, Toulouse (FR);
CONTINENTAL AUTOMOTIVE GMBH, Hannover (DE)

( * ) Notice: Subject to any disclaimer, the term of this patent is extended or adjusted under 35 U.S.C. 154(b) by 234 days.

(21) Appl. No.: 15/568,831

(22) PCT Filed: Apr. 26, 2016

(86) PCT No.: PCT/EP2016/000659
§ 371 (c)(1),
(2) Date: Oct. 24, 2017

(87) PCT Pub. No.: WO2016/173704
PCT Pub. Date: Nov. 3, 2016

(65) Prior Publication Data
US 2018/0114379 A1    Apr. 26, 2018

(30) Foreign Application Priority Data

Apr. 29, 2015 (FR) ...................................... 15 53898

(51) Int. Cl.
*G07C 5/08* (2006.01)
*B60C 23/04* (2006.01)

(52) U.S. Cl.
CPC ........ *G07C 5/0808* (2013.01); *B60C 23/0416* (2013.01); *B60C 23/0488* (2013.01); *B60C 23/0489* (2013.01)

(58) Field of Classification Search
CPC .............. G07C 5/0808; B60C 23/0489; B60C 23/0416; B60C 23/0488
See application file for complete search history.

(56) References Cited

U.S. PATENT DOCUMENTS

| | | | |
|---|---|---|---|
| 4,398,260 A | * | 8/1983 | Takahashi ........... B60T 8/17616 188/DIG. 1 |
| 8,843,267 B2 | * | 9/2014 | Park .................... B60C 23/0416 701/34.4 |

(Continued)

FOREIGN PATENT DOCUMENTS

| CN | 101144723 | 3/2008 |
|---|---|---|
| CN | 101678728 | 3/2010 |

(Continued)

OTHER PUBLICATIONS

International Search Report, dated Jul. 5, 2016, from corresponding PCT/EP2016/000659 application.

*Primary Examiner* — Frederick M Brushaber
(74) *Attorney, Agent, or Firm* — Young & Thompson

(57) ABSTRACT

Disclosed is a method of locating the position of wheels of a vehicle equipped with an electronic unit for measuring operating parameters of each wheel, involving, for the purpose of locating the position of a wheel, the ordering of the transmission, by the electronic unit outfitting that wheel, of n RFi signals transmitted at times $t_1$ to $t_n$ for angular positions $\theta_1$ to $\theta_n$ of the electronic unit, to a central unit additionally connected to speed sensors that are each positioned in proximity to a wheel and able to furnish data $\delta_j$ representative of the orientation of the wheel.

20 Claims, 2 Drawing Sheets

(56) References Cited

U.S. PATENT DOCUMENTS

| | | | | |
|---|---|---|---|---|
| 9,165,413 B2* | 10/2015 | Jones | ............ | G07C 5/0816 |
| 9,463,673 B2* | 10/2016 | Huang | ............ | B60C 23/0433 |
| 9,524,592 B2* | 12/2016 | Jones | ............ | G07C 5/008 |
| 9,884,524 B2* | 2/2018 | Guinart | ............ | B60C 23/0416 |
| 10,166,822 B2* | 1/2019 | Kosugi | ............ | B60C 23/0416 |
| 2003/0062859 A1* | 4/2003 | Amann | ............ | B60L 15/20 |
| | | | | 318/114 |
| 2003/0187563 A1* | 10/2003 | Fonzes | ............ | B60C 23/0416 |
| | | | | 701/70 |
| 2008/0067867 A1* | 3/2008 | Taguchi | ............ | B60T 8/172 |
| | | | | 303/167 |
| 2010/0171604 A1* | 7/2010 | Heller | ............ | B60C 23/0416 |
| | | | | 340/438 |
| 2010/0274441 A1* | 10/2010 | Carresjo | ............ | B60C 23/0416 |
| | | | | 701/31.4 |
| 2012/0316829 A1* | 12/2012 | Kessler | ............ | B60C 23/0416 |
| | | | | 702/150 |
| 2013/0261894 A1* | 10/2013 | Kojima | ............ | B62D 5/0463 |
| | | | | 701/41 |
| 2014/0019003 A1* | 1/2014 | Guinart | ............ | B60C 23/0488 |
| | | | | 701/34.4 |
| 2014/0088792 A1* | 3/2014 | Saito | ............ | F16F 15/002 |
| | | | | 701/1 |

FOREIGN PATENT DOCUMENTS

| | | |
|---|---|---|
| CN | 101883690 | 11/2010 |
| CN | 102791499 | 11/2012 |
| FR | 2815119 | 4/2002 |
| WO | 2012/139711 A1 | 10/2012 |

* cited by examiner

METHOD OF LOCATING THE POSITION OF WHEELS OF AN AUTOMOTIVE VEHICLE

The invention concerns a method of locating the position of wheels of an automotive vehicle equipped with an electronic unit adapted to send to a central unit mounted on the vehicle signals containing data representative of operating parameters of each wheel and an identification code of said electronic unit.

BACKGROUND OF THE INVENTION

Many methods have been proposed at present for the purpose of locating the position of the wheels of a vehicle, including methods of location by synchronization and angular correlation, such as in particular the method described in the patent application WO 2012/139711, whose concept is based on the correlation existing between the signals put out by a speed sensor equipping a wheel and synchronized signals put out by a speed sensor mounted on the vehicle in proximity to this wheel.

Such methods of location by synchronization and angular correlation pertain to vehicles having:

r wheels equipped with an electronic unit integrating means of measuring the angular position of said electronic unit and a transmitter designed to transmit signals containing data representative of operating parameters of each wheel and an identification code of said electronic unit, positioned on the vehicle in proximity to each of the wheels, a wheel speed sensor able to furnish data representative of the orientation of the wheel, and, integrated in the vehicle, a central unit, on the one hand, provided with a receiver for the receiving of the signals coming from the electronic units, and on the other hand connected to the different wheel speed sensors, and involving, according to the method described in the patent application WO 2012/139711, for the purpose of locating the position of a wheel:

for the electronic unit equipping said wheel, the furnishing to the central unit, at successive times $t_1$ $t_n$, of n signals RF1 . . . RFn transmitted for at least one angular position $\theta_1$ . . . $\theta_n$ of said electronic unit, each of the n signals RF1 . . . RFn containing the identification code of the electronic unit and data representative of the angular position $\theta_1$ . . . $\theta_n$ of transmission, for the central unit:
the gathering of the values $\beta_1$ . . . $\beta_n$ measured by each of the r wheel speed sensors, for each of the successive times $t_1$ to $t_n$, and the determining of so-called compensated values $\delta_1$ to $\delta_n$, determined in relation to a fixed unique reference position, by a compensation of each measured value $\beta_1$ . . . $\beta_n$ as a function of the data representative of the angular position $\theta_1$ . . . $\theta_n$ of transmission of the associated signal RF1 . . . RFn,
the calculating, for each series of compensated values $\delta_1$ to $\delta_n$ associated with a wheel speed sensor, of a characteristic value $V_n1, V_n2 \ldots V_nr$ representative of the dispersion of said series of values, and the assigning of the identification code of the electronic unit to the position of the wheel situated in proximity to the wheel speed sensor at the origin of the most clustered series of angular values $\delta_1$-$\delta_n$.

It should be noted that, in the present patent application, we understand the term "angular position $\theta_1$ . . . $\theta_n$ of transmission of the RF signals by the electronic units" to mean:

either transmissions for different angular positions $\theta_1$ . . . $\theta_n$ of predetermined values, or transmissions for identical angular positions $\theta_1$ . . . $\theta_n$, and thus transmissions for a fixed angular position, or transmissions effectuated after predetermined variable periods of time, calculated with a fixed angular position for the origin, or transmissions combining different angular positions $\theta_1$ . . . $\theta_n$ and predetermined variable periods of time with said angular positions $\theta_1$ . . . $\theta_n$ for the origins.

The majority of current vehicles being equipped with active safety systems such as "ABS" for antilocking of wheels, and "ESP" for dynamic stability control, such methods of location by synchronization and angular correlation are of major interest especially in terms of installation cost, because the locating of the wheels is done by correlation of the signals furnished by the speed sensors of said active safety system and signals furnished by the speed sensors usually integrated in the electronic units of the monitoring system.

Hence, in fact, the implementing of these methods of location by synchronization and angular correlation simply requires the implementation of software for processing of the signals furnished, but does not need the addition of any specific hardware.

On the other hand, the reliability of such methods of location is based on the ability of the electronic units to furnish the signals RF1 . . . RFn for particular angular positions $\theta_1$ . . . $\theta_n$ with restricted margins of error.

Yet it occurs rather frequently in practice that, during the transmission of signals RF1 . . . RFn, the actual angular positions of the electronic units differ from a consistent value as compared to the data representative of the angular position $\theta_1$ . . . $\theta_n$ of transmission as transmitted by these signals RF1 . . . RFn, so that this data turns out to consist of aberrant data.

In the majority of cases, such aberrant data only has the consequence of increasing the length of the wheel locating procedure. However, the transmission of this aberrant data may also have the consequence of an errored locating of the position of the wheels.

The only solutions contemplated at present for mitigating the drawbacks involving the transmission of such errored data are solutions based on classical statistical tools.

However, such statistical tools require working with a substantial population in order to evaluate individually the quality of the angular position of each of the transmissions, and therefore these statistical tools require sizeable capacities in terms of data storage memory.

Moreover, the individual evaluation of the quality of the angular position is usually based on a determination of deviations from a mean, and these statistical methods thus need to wait until the population reaches a substantial size in order to obtain relevant decisions. Hence, such statistical methods generate an initial latency period during which the aberrant data cannot be detected or processed.

The present invention intends to mitigate these drawbacks and its first objective is to provide a method of location by synchronization and angular correlation incorporating a procedure for detection of aberrant data regarding the angular position $\theta_1$ . . . $\theta_n$ of transmission of the signals by the electronic units, responsive to the first transmissions of signals.

Another objective of the invention is to provide a method of location whose procedure for detection of aberrant data requires slight data storage capacity.

Another objective of the invention is to provide a method of location whose procedure for detection of aberrant data implements a method requiring only available data necessary to the locating of the wheels.

SUMMARY OF THE INVENTION

For this purpose, the invention proposes a method for locating the position of wheels of the type described in the preamble above, involving, in a preliminary phase, the determining of an angular value dmax corresponding to an angular tolerance of precision allowable for the angular position θi of transmission of each signal RFi, and the determining of a corresponding compensated value $\delta_{max}$, and then for each electronic unit:

upon the receipt of each RFi signal furnished by said electronic unit, with i≥3, a value is calculated that is representative of the mean $\overline{X}(i)$ of the i compensated values $\delta_1$ to $\delta_i$ obtained for each of the r wheel speed sensors, upon receipt of each RF(i+1) signal, with i≥3, the compensated value $\delta_{(i+1)}$ obtained for each of the r wheel speed sensors is measured, for each compensated value $\delta_{(i+1)}$ a so-called comparison angular value $\delta_{com}$ is calculated, such that: $\delta_{com}=\delta_{(i+1)}-\overline{X}(i)$, and the RF(i+1) signal is eliminated when all the calculated values $\delta_{com}$, each of which corresponds to a wheel speed sensor, are such that: $\delta_{com} \geq \delta_{max}$.

According to the invention, the procedure for detection of aberrant data thus consists in an iterative method responsive at least upon the receipt of three signals coming from an electronic unit, and requiring a reduced number of windows of signals RFi and thus a slight storage memory capacity.

According to one advantageous embodiment of the invention, the method of location furthermore involves, for each electronic unit, after the receipt of the first three signals RF1-RF3 furnished by said electronic unit:

calculating the maximum angular deviation between the 3 compensated values $\delta_1$ to $\delta_3$ obtained for each of the r wheel speed sensors, eliminating the group of the first three signals RF1-RF3, and ordering an overall reinitialization of the location procedure when for all the wheel speed sensors the maximum deviation between the 3 compensated values $\delta_1$ to $\delta_3$ is greater than a predetermined compensated value $\delta 3_{max}$ which is lower in value than the value $\delta_{max}$.

The mode of implementation is designed to eliminate any aberrant data which has been furnished during the transmission of the first three RF signals, and thus helps guarantee that the value of the mean $\overline{X}(i)$ used as the basis for the detection of aberrant data during the reception of the later RF signals is established from consistent values.

For the same purpose, according to one advantageous embodiment of the invention, the method of location furthermore involves, for each electronic unit, after receipt of the first two signals RF1-RF2 furnished by said electronic unit:

calculating the maximum angular deviation between the 2 compensated values $\delta_1$ to $\delta_2$ obtained for each of the r wheel speed sensors, eliminating the first two signals RF1, RF2, and ordering an overall reinitialization of the location procedure when for all the wheel speed sensors the deviation between the 2 compensated values $\delta_1$, $\delta_2$ is greater than a predetermined value $\delta 2_{max}$ which is lower in value than the value $\delta 3_{max}$.

This embodiment is intended to strengthen the guaranteed determination of a consistent base value for the mean $\overline{X}(i)$.

According to another advantageous embodiment of the invention, the assigning of an identification code of an electronic unit to a wheel position involves, starting with the receipt of the third signal RFi, selecting the two characteristic values $V_n1$, $V_n2$ of the lowest value, with $V_n2 > V_n1$, and then when the ratio $V_n2/V_n1$ is greater than a predetermined threshold assigning the identification code to the wheel situated in proximity to the wheel speed sensor at the origin of the series of angular values having the characteristic value $V_n1$.

In this case, for the purpose of the detection of aberrant data and in an advantageous manner according to the invention:

one calculates only the angular comparison value $\delta_{corm}$ of the at least one of the two series of compensated values $\delta_1$ to $\delta_1$ corresponding to the characteristic values $V_n1$, $V_n2$, one eliminates the signal Rfi when each calculated value $\delta_{com}$ is such that: $\delta_{com} \geq \delta_{max}$.

This embodiment results in greater effectiveness of the procedure of detection of aberrant data because the iterative method is applied solely to at most two characteristic values representative of preselected wheel positions.

Furthermore, advantageously according to the invention, upon receipt of a signal RFi, with i≥3, coming from an electronic unit:

one takes into account, for the purpose of the determination of the new characteristic value of each dispersion, the selected value $\delta_i$ such that the angular distance d between the value $\delta_1$ and the mean $\overline{X}(i-1)$ of the (i−1) compensated values $\delta_1$-$\delta_{i-1}$ is equal to min(d1, d2), where d1 and d2 represent the two complementary angular sectors delimited by the values $\delta_i$ and $\overline{X}(i-1)$ situated on a circular circumference, one calculates characteristic values $V_i$ of the dispersion of i angular values such that:

$$V_i = V_{i-1} \times (i-1)/i + d^2 \times (i-1)/i^2 \text{ with } d=\min(d1,d2)$$

Based on this advantageous location procedure, furthermore, and advantageously according to the invention:

one transforms the value $\delta_{max}$ corresponding to the angular tolerance of precision dmax allowable for the angular position $\theta_i$ of transmission of each signal RFi, into values Max($V_i$-$V_{i-1}$) expressed in terms of maximum variation value of variances, and such that, for each characteristic value $V_i1$, $V_i2$ ... $V_ir$:

$$\text{Max}(V_i\text{-}V_{i-1}) = ((i-1)/i^2) \times (d\text{max})^2 - (V_{i-1})/i,$$

one transforms each comparison value $\delta_{com}$ into a value ($V_i$-$V_{i-1}$) expressed in terms of a variation of variances, and one eliminates the signals RFi when each value ($V_i$-$V_{i-1}$) corresponding to a wheel speed sensor is greater than or equal to the corresponding value Max($V_i$-$V_{i-1}$) calculated for this wheel speed sensor.

This advantageous embodiment thus consists in using the values of the variances used furthermore for the purpose of the location proper, for the purpose of detecting any aberrant data.

According to another advantageous embodiment of the invention, one increments the number of signals RFi eliminated, and one proceeds with an overall reinitialization of the location procedure when the number of signals eliminated exceeds a predetermined threshold.

BRIEF DESCRIPTION OF THE DRAWINGS

Other characteristics, purposes and advantages of the invention will emerge from the following detailed description making reference to the appended drawings, which represent a nonlimiting preferred sample embodiment. In these drawings.

DETAILED DESCRIPTION OF THE PREFERRED EMBODIMENTS

Figure 1:
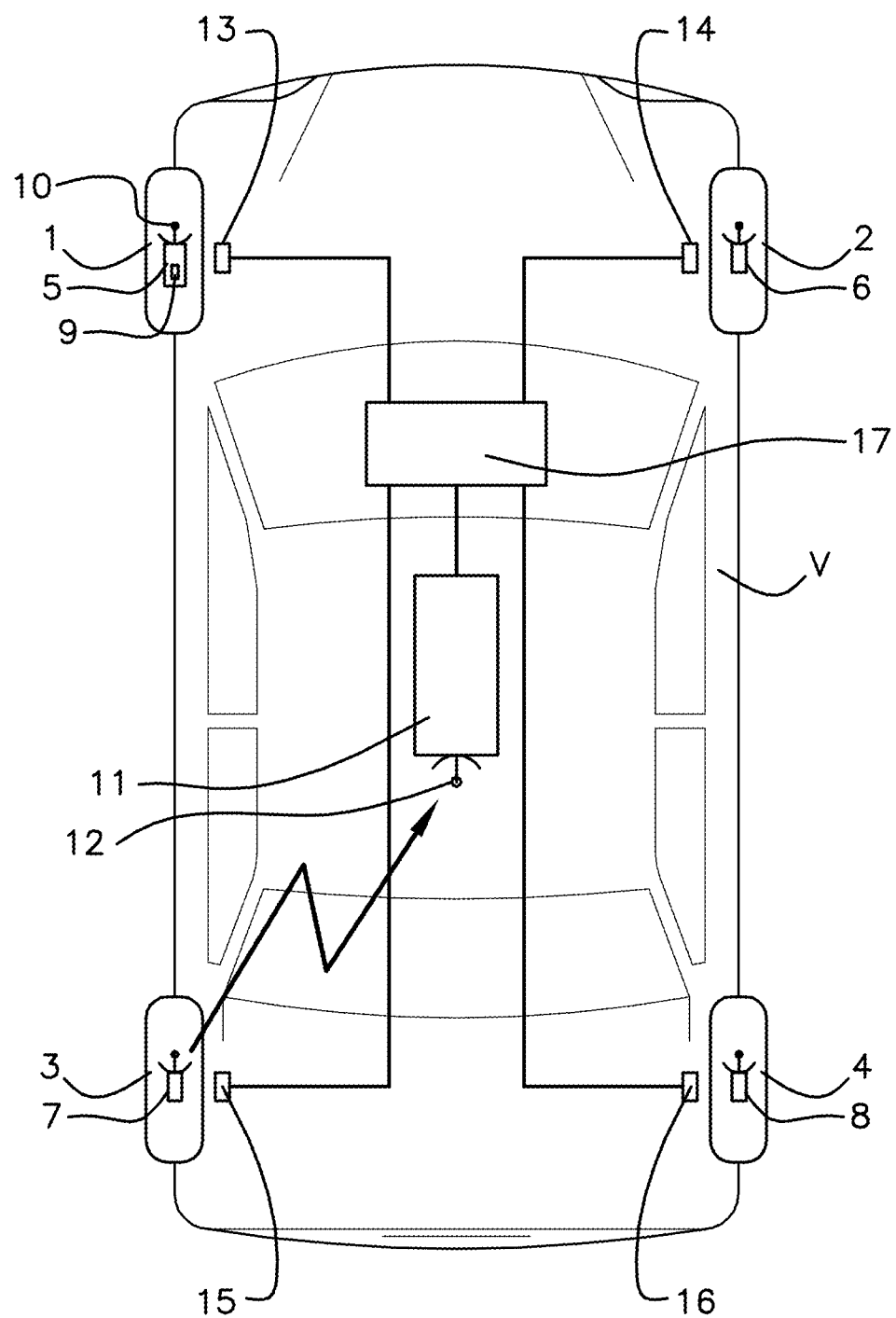
FIG. 1 is a schematic top view of a vehicle having a monitoring system and an active safety system enabling an implementing of the method according to the invention for locating the position of the wheels of said vehicle, FIGS. 2a to 2d consist of four diagrams each representing, during the locating of a wheel, dispersions of values obtained from measurements performed by one of the wheel speed sensors.

The method according to the invention is adapted to being implemented for the purpose of locating the position of wheels of a vehicle V, as represented in FIG. 1, outfitted with four wheels 1-4 and equipped with a system for monitoring of parameters of tires, such as pressure or temperature, and an active safety system such as an "ABS" antilock wheel system or "ESP" dynamic stability control system.

Usually, the monitoring system typically comprises, in the first place, an electronic unit 5-8 associated with each wheel 1-4, for example one joined to the rim of said wheel so as to be positioned inside the casing of the tire.

Each of these electronic units 5-8 integrates sensors dedicated to the measuring of the parameters of the tires, being connected to a microprocessor computing unit which is connected to a transmitter 10.

Each of these electronic units 5-8 likewise integrates, in a classical manner, means 9 of measuring the angular position of said electronic unit. Such measurement means may advantageously consist of an accelerometer able to furnish modulated signals representative of values of gravity and thus of the angular position of the electronic unit, whose frequency, being equal to the frequency of rotation of the wheels, furthermore allows calculating of the speed of rotation of said wheels.

The monitoring system likewise comprises a central unit 11 situated in the vehicle V, comprising a microprocessor and integrating a receiver 12 able to receive the signals sent by the transmitters 10 of each of the four electronic units 5-8.

The vehicle V is likewise equipped with an active safety system such as an "ABS" antilock wheel system or "ESP" dynamic stability control system, comprising four wheel speed sensors 13-16 positioned on the vehicle V, each in proximity to a wheel 1-4, and adapted to furnish, in the form of values convertible into angular values, data representative of the orientation of said wheel.

Moreover, this active safety system comprises an "ABS" or "ESP" computer 17 connected to the various wheel speed sensors 13-16, so as to receive the wheel speed information measured by said sensors, and programmed to anticipate the adjustments designed to prevent locking of the wheels 1-4.

Usually, the wheel speed sensors 13-16 consist of inductive, magnetoresistive, or Hall effect sensors, which are adapted to measure the conditions of each wheel 1-4 on a toothed or magnetic wheel.

For the purpose of the locating of each wheel 1-4 of the vehicle V, the method according to the invention consists in using the data furnished by the accelerometers 9 and the sensors 13-16, according to the method described below.

In the first place, the electronic unit 5-8 equipping the wheel 1-4 to be located furnishes a plurality of signals RF1, RF2 . . . RFn transmitted at successive times $t_1, t_2 \ldots t_n$ for angular positions respectively $\theta_1, \theta_2 \ldots \theta_n$ of said electronic unit. Each of these n signals RF1 . . . RFn in particular comprises, in a usual manner, the identification code of the electronic unit 5-8 and representative data for the angular position of transmission.

In parallel, each sensor 13-16 furnishes to the computer 17 the measured values $\beta_1 \ldots \beta_n$ representative, for each successive time $t_1$ to $t_n$, of the orientation of the wheel 1-4 located opposite said measurement sensor.

The implementing of the location procedure according to the invention requires, first of all, a determining and memorizing of an angular value dmax, for example equal to 45°, corresponding to an angular tolerance of precision allowable for the angular position Oi of transmission of each signal Rfi.

For the purpose of this implementation, the central unit 11 of the monitoring system is programmed, first of all, for each electronic unit 5-8:

to gather the values $\beta_1 \ldots \beta_n$ measured for each of the r wheel speed sensors 13-16, for each of the successive times $t_1$ to $t_n$ of transmission, by said electronic unit, of then signals RF1 . . . RFn, to determine so-called compensated values $\delta_1$ to $\delta_n$, determined with respect to a fixed unique reference position, by a compensation of each measured value $\beta_1 \ldots \beta_n$ as a function of representative data of the angular position $\theta_1 \ldots \theta_n$ of transmission of the associated signal RF1 . . . RFn.

The processing of these compensated values $\delta_1$ to $\delta_n$ involves, first of all, after receipt of the first two signals RF1-RF2 furnished by an electronic unit 5-8:

calculating the maximum angular deviation between the 2 compensated values $\delta_1, \delta_2$ obtained for each of the r wheel speed sensors 13-16, eliminating the first two signals RF1-RF2, and ordering an overall reinitialization of the location procedure when, for all the wheel speed sensors 13-16, the maximum deviation between the 2 compensated values $\delta_1$, $\delta_2$ is greater than a predetermined compensated value $\delta 2_{max}$ corresponding to an angular value d2max less than dmax, and for example equal to 18° for a value dmax=45°.

The next step, carried out after validation of the first two signals RF1-RF2 furnished by an electronic unit 5-8, involves, after receipt of the third signal RF3 furnished by said electronic unit:

calculating the maximum angular deviation between the 3 compensated values $\delta_1$ to $\delta_3$ obtained for each of the r wheel speed sensors 13-16, eliminating all three first signals RF1-RF3, and ordering an overall reinitialization of the location procedure when, for all the wheel speed sensors 13-16, the maximum deviation between the 3 compensated values $\delta_1$ to $\delta_3$ is greater than a predetermined compensated value $\delta 3_{max}$ corresponding to an angular value d3max greater than d2max and less than dmax, and for example equal to 30° for a value d2max=18° and a value dmax=45°.

The processing of the compensated values $\delta_1$ to $\delta_n$ then involves, after validation of the first three signals RF1-RF3 to be calculated for each signal RFi coming from an electronic unit 5-8, calculating for each series of compensated values $\delta_1$ to $\delta_i$ associated with a wheel speed sensor 13-16 a characteristic value $V_n 1, V_n 2 \ldots V_n r$, in the example, the variance representative of the dispersion of said series of values.

Figure 2A:
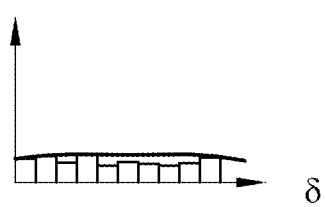
Figure 2B:
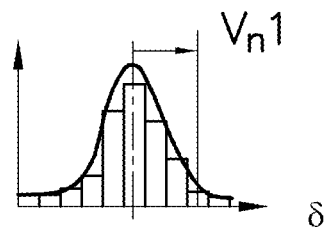
Figure 2C:
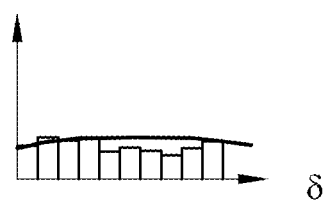
Figure 2D:
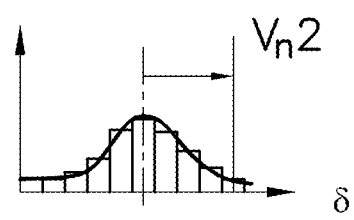
Figure 3:
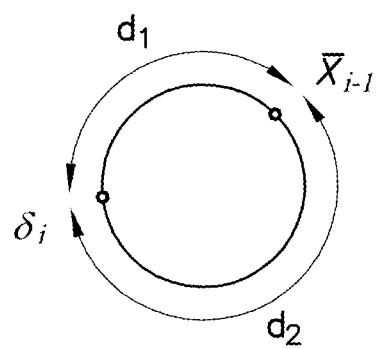
FIG. 3 is a diagram explaining the principle of determination of the angular distance d upon receiving a new signal of order n coming from an electronic unit.

For this purpose, according to the invention one calculates first of all, after validation of the third signal RF3, the variances $V_31$, $V_32$ ... $V_3r$ of the series of compensated values $\delta_1$ to $\delta_3$, and then, upon receiving each following signal RFi, with i>3, coming from an electronic unit 5-8, one takes into account, for the purpose of the determination of the characteristic value $V_i$ of each dispersion, the value $\delta_i$ selected such that the angular distance d between the value $\delta_i$ and the mean $\overline{X}(i-1)$ of the (i−1) values $\delta_1$–$\delta_{i-1}$ is equal to min(d1, d2), where d1 and d2 represent, as shown in FIG. 3, the two complementary angular sectors delimited by the values $\delta_i$ and $\overline{X}(i-1)$ situated on a circular circumference, and:

one calculates the variances $V_i$ of the dispersion of the i angular values by means of the formula:

$$V_i = V_{i-1} \times (i-1)/i + d^2 \times (i-1)/i^2$$

with d=min(d1, d2)

one selects the two characteristic values $V_i1$, $V_i2$ of lowest value, with $V_i2 > V_i1$ (values of the dispersions represented in FIGS. 2b and 2d which correspond to the dispersions obtained for a number n of signals RFi), one compares the ratio $V_i2/V_i1$ to a predetermined decision threshold, and:

one assigns the identification code to the wheel 1-4 situated in proximity to the wheel speed sensor 13-16 at the origin of the series of angular values having the variance $V_i1$, when the ratio $V_i2/V_i1$ is greater than the decision threshold, one continues the location procedure when the ratio $V_i2/V_i1$ is less than the decision threshold.

Moreover, the decision threshold advantageously has a value inversely proportional to the number of signals transmitted by the electronic unit 5-8. Thus, as an example, such as is described in the patent application WO 2012/139711, this decision threshold may vary between a maximum value equal to 8 for a number of signals transmitted by the electronic unit 5-8 equal to ten, and a minimum value equal to 2 for a number of signals transmitted equal to or greater than twenty.

Moreover, according to the invention, upon receiving each signal RFi coming from an electronic unit 5-8, and for at least one of the two characteristic values $V_i1$, $V_i2$ of lowest value, but preferably for these two values:

one calculates, for each calculated value Vi corresponding to a wheel speed sensor 13-16, a value Max($V_i$-$V_{i-1}$) expressing a maximum allowable value as the variation of the variances, and such that:

$$\text{Max}(V_i - V_{i-1}) = ((i-1) \times (d\text{max})^2 - (V_{i-1}))/i,$$

one eliminates the signals RFi when each calculated value ($V_i$-$V_{i-1}$), each of which corresponds to a wheel speed sensor 13-16, is greater than or equal to the corresponding value Max($V_i$-$V_{i-1}$) calculated for this wheel speed sensor 13-16.

Furthermore, one increments the number of signals RFi eliminated, and one proceeds with an overall reinitialization of the location procedure when the number of signals eliminated exceeds a predetermined threshold.

As an example, the number of signals eliminated and resulting in an overall reinitialization is chosen equal to 5.

The method of location according to the invention as described above has the advantage of being a high-performance method in terms of responsiveness and reliability, furthermore not being susceptible to being affected by the transmission of aberrant data by the electronic units.

The invention claimed is:

1. A method of locating the position of wheels (1-4) of a vehicle (V) with r wheels (1-4), each wheel of said r wheels equipped with an electronic apparatus (5-8) that includes at least means of measuring (9) an angular position of the electronic apparatus and a transmitter (10) configured to transmit signals containing data representative of operating parameters of the wheel and an identification code of the electronic apparatus, a wheel speed sensor (13-16) positioned on the vehicle (V) in proximity to each one of said wheels (1-4) and configured to generate data representative of the orientation of the one of said wheel wheels (1-4), and, integrated in the vehicle (V), a central monitoring apparatus (11) with a receiver (12) configured to receive the signals transmitted from the electronic apparatuses (5-8) and connected to each of the wheel speed sensors (13-16), said method comprising:

at the electronic apparatus (5-8) of a wheel of said wheels, furnishing to the central monitoring apparatus (11), at successive times $t_1$ ... $t_n$, n signals RF1 ... RFn transmitted for at least one angular position $\theta_1$ ... $\theta_n$ of said electronic apparatus, each of the n signals RF1 ... RFn containing the identification code of the electronic apparatus (5-8) and data representative of the angular position $\theta_1$ ... $\theta_n$ of transmission; and at the central monitoring apparatus (11):

receiving and storing the values $\beta1$ ... $\beta n$ measured by each of the r wheel speed sensors (13-16), for each of the successive times $\delta_1$ to $t_n$, and determining compensated values $\delta_1$ to $\delta_n$, determined in relation to a fixed unique reference position, by a compensation of each measured value $\beta1$ ... $\beta n$ as a function of the data representative of the angular position $\theta_1$ ... $\theta_n$ of transmission of the associated signal RF1 ... RFn, calculating, for each series of compensated values $\delta_1$ to $\delta_n$ associated with a wheel speed sensor (13-16), a characteristic value $V_n1$, $V_n2$ ... $V_nr$ representative of a dispersion of said series of values, and assigning the identification code of the electronic apparatus (5-8) to a position of the wheel (1-4) situated in proximity to the wheel speed sensor (13-16) at an origin of a most clustered series of angular values $\delta_1$-$\delta_n$, wherein and said method further comprises, in a preliminary phase:

determining an angular value dmax corresponding to an angular tolerance of precision allowable for the angular position $\theta_i$ of transmission of each signal RFi, determining a corresponding compensated value $\delta_{max}$, and then for each electronic apparatus:

upon receipt of each RFi signal furnished by said electronic apparatus, with i≥3, a value is calculated that is representative of the mean (i) of the i compensated values $\delta_1$ to $\delta_i$ obtained for each of the r wheel speed sensors (13-16), upon receipt of each RF(i+1) signal, with i≥3, the compensated value $\delta_{(i+1)}$ obtained for each of the r wheel speed sensors (13-16) is measured, for each compensated value $\delta_{(i+1)}$ a comparison angular value $\delta_{com}$ is calculated, such that: $\delta_{com} = \delta_{(i+1)} - (i)$, and the RF(i+1) signal is eliminated when all the calculated values $\delta_{com}$, each of which corresponds to a wheel speed sensor (13-16), are such that: $\delta_{com} \geq \delta_{max}$.

2. The method of location as claimed in claim 1,
   wherein the assigning of the identification code of the electronic apparatus (5-8) to the position of the wheel (1-4) includes, starting with receipt of a third signal RFi, selecting two characteristic values $V_n1$, $V_n2$ of lowest value, with $V_n2 > V_n1$, and then when the ratio $V_n2/V_n1$ is greater than a predetermined threshold, assigning the identification code to the wheel (1-4) situated in proximity to the wheel speed sensor (13-16) at an origin of a series of angular values having the characteristic value $V_n^1$,
   wherein only the angular comparison value $\delta_{com}$ of the at least one of the two series of compensated values $\delta_1$ to $\delta_i$ corresponding to the characteristic values $V_n1$, $V_n2$ is calculated, and
   wherein the signal Rfi is eliminated when each calculated value δcom is such that: $\delta_{com} \geq \delta_{max}$.

3. The method of location as claimed in claim 2, wherein, upon reception of a signal RFi, with i≥3, coming from an electronic apparatus (5-8):
   for determining a new characteristic value of each dispersion, selecting a value $\delta_i$ such that the angular distance d between the value $\delta_i$ and the mean (i−1) of the (i−1) compensated values $\delta_1$-$\delta_i$−1 is equal to min (d1, d2), where d1 and d2 represent two complementary angular sectors delimited by the values $\delta_i$ and (i−1) situated on a circular circumference, and
   calculating characteristic values $V_i$ of the dispersion of i angular values such that:

$$V_i = V_{i-1} \times (i-1)/i + d^2 \times (i-1)/i^2$$

with d=min(d1, d2).

4. The method of location as claimed in claim 3, further comprising, for each electronic apparatus (5-8) and after receipt of a first three signals RF1-RF3 furnished by said electronic apparatus:
   calculating a maximum angular deviation between the three compensated values $\delta_1$ to $\delta_3$ obtained for each of the r wheel speed sensors (13-16); and
   eliminating a group of the first three signals RF1-RF3, and ordering an overall reinitialization of the location procedure when for all the wheel speed sensors (13-16) a maximum deviation between the three compensated values $\delta_1$ to $\delta_3$ is greater than a predetermined compensated value $\delta3_{max}$ which is lower in value than the value $\delta_{max}$.

5. The method of location as claimed in claim 3, further comprising:
   incrementing a number of signals RFi eliminated; and
   reinitializing the location procedure when the number of signals eliminated exceeds a predetermined threshold.

6. The method of location as claimed in claim 2, further comprising:
   incrementing a number of signals RFi eliminated; and
   reinitializing the location procedure when the number of signals eliminated exceeds a predetermined threshold.

7. The method of location as claimed in claim 6, further comprising, for each electronic apparatus (5-8) and after receipt of a first three signals RF1-RF3 furnished by said electronic apparatus:
   calculating a maximum angular deviation between the three compensated values $\delta_1$ to $\delta_3$ obtained for each of the r wheel speed sensors (13-16); and
   eliminating a group of the first three signals RF1-RF3, and ordering an overall reinitialization of the location procedure when for all the wheel speed sensors (13-16) a maximum deviation between the three compensated values $\delta_1$ to $\delta_3$ is greater than a predetermined compensated value $\delta3_{max}$ which is lower in value than the value $\delta_{max}$.

8. The method of location as claimed in claim 2, further comprising, for each electronic apparatus (5-8) and after receipt of a first three signals RF1-RF3 furnished by said electronic apparatus:
   calculating a maximum angular deviation between the three compensated values $\delta_1$ to $\delta_3$ obtained for each of the r wheel speed sensors (13-16); and
   eliminating a group of the first three signals RF1-RF3, and ordering an overall reinitialization of the location procedure when for all the wheel speed sensors (13-16) a maximum deviation between the three compensated values $\delta_1$ to $\delta_3$ is greater than a predetermined compensated value $\delta3_{max}$ which is lower in value than the value $\delta_{max}$.

9. The method of location as claimed in claim 1, wherein, upon reception of a signal RFi, with i≥3, coming from an electronic apparatus (5-8):
   for determining a new characteristic value of each dispersion, selecting a value $\delta_i$ such that the angular distance d between the value $\delta_i$ and the mean (i−1) of the (i−1) compensated values $\delta_1$-$\delta_i$−1 is equal to min (d1, d2), where d1 and d2 represent two complementary angular sectors delimited by the values $\delta_i$ and (i−1) situated on a circular circumference, and
   calculating characteristic values $V_i$ of the dispersion of i angular values such that:

$$V_i = V_{i-1} \times (i-1)/i + d^2 \times (i-1)/i^2$$

with d=min(d1, d2).

10. The method of location as claimed in claim 9, further comprising:
    transforming the value $\delta_{max}$ corresponding to the angular tolerance of precision dmax allowable for the angular position $\theta_i$ of transmission of each signal RFi, into values Max $(V_i - V_{i-1})$ expressed in terms of maximum variation value of variances, and such that, for each characteristic value $V_i1$, $V_i2$ ... $V_ir$:

$$\text{Max}(V_i - V_{i-1}) = ((i-1)/i^2) \times (d\text{max})^2 - (V_{i-1})/i;$$

transforming each comparison value $\delta_{com}$ into a value $(V_i - V_{i-1})$ expressed in terms of a variation of variances; and
    eliminating the signals RFi when each calculated value $(V_i - V_{i-1})$ corresponding to a wheel speed sensor (13-16) is greater than or equal to the corresponding value $\text{Max}(V_i - V_{i-1})$ calculated for this wheel speed sensor (13-16).

11. The method of location as claimed in claim 10, further comprising:
    incrementing a number of signals RFi eliminated; and
    reinitializing the location procedure when the number of signals eliminated exceeds a predetermined threshold.

12. The method of location as claimed in claim 11, further comprising, for each electronic apparatus (5-8) and after receipt of a first three signals RF1-RF3 furnished by said electronic apparatus:
    calculating a maximum angular deviation between the three compensated values $\delta_1$ to $\delta_3$ obtained for each of the r wheel speed sensors (13-16); and
    eliminating a group of the first three signals RF1-RF3, and ordering an overall reinitialization of the location procedure when for all the wheel speed sensors (13-16) a maximum deviation between the three compensated values $\delta_1$ to $\delta_3$ is greater than a predetermined compensated value $\delta3_{max}$ which is lower in value than the value $\delta_{max}$.

13. The method of location as claimed in claim 10, further comprising, for each electronic apparatus (5-8) and after receipt of a first three signals RF1-RF3 furnished by said electronic apparatus:
calculating a maximum angular deviation between the three compensated values $\delta_1$ to $\delta_3$ obtained for each of the r wheel speed sensors (13-16); and
eliminating a group of the first three signals RF1-RF3, and ordering an overall reinitialization of the location procedure when for all the wheel speed sensors (13-16) a maximum deviation between the three compensated values $\delta_1$ to $\delta_3$ is greater than a predetermined compensated value $\delta3_{max}$ which is lower in value than the value $\delta_{max}$.

14. The method of location as claimed in claim 9, further comprising:
incrementing a number of signals RFi eliminated; and
reinitializing the location procedure when the number of signals eliminated exceeds a predetermined threshold.

15. The method of location as claimed in claim 14, further comprising, for each electronic apparatus (5-8) and after receipt of a first three signals RF1-RF3 furnished by said electronic apparatus:
calculating a maximum angular deviation between the three compensated values $\delta_1$ to $\delta_3$ obtained for each of the r wheel speed sensors (13-16); and
eliminating a group of the first three signals RF1-RF3, and ordering an overall reinitialization of the location procedure when for all the wheel speed sensors (13-16) a maximum deviation between the three compensated values $\delta_i$ to $\delta_3$ is greater than a predetermined compensated value $\delta3_{max}$ which is lower in value than the value $\delta_{max}$.

16. The method of location as claimed in claim 9, further comprising, for each electronic apparatus (5-8) and after receipt of a first three signals RF1-RF3 furnished by said electronic apparatus:
calculating a maximum angular deviation between the three compensated values $\delta_1$ to $\delta_3$ obtained for each of the r wheel speed sensors (13-16); and
eliminating a group of the first three signals RF1-RF3, and ordering an overall reinitialization of the location procedure when for all the wheel speed sensors (13-16) a maximum deviation between the three compensated values $\delta_1$ to $\delta_3$ is greater than a predetermined compensated value $\delta3_{max}$ which is lower in value than the value $\delta_{max}$.

17. The method of location as claimed in claim 1, further comprising:
incrementing a number of signals RFi eliminated; and
reinitializing the location procedure when the number of signals eliminated exceeds a predetermined threshold.

18. The method of location as claimed in claim 17, further comprising, for each electronic apparatus (5-8) and after receipt of a first three signals RF1-RF3 furnished by said electronic apparatus:
calculating a maximum angular deviation between the three compensated values $\delta_1$ to $\delta_3$ obtained for each of the r wheel speed sensors (13-16); and
eliminating a group of the first three signals RF1-RF3, and ordering an overall reinitialization of the location procedure when for all the wheel speed sensors (13-16) a maximum deviation between the three compensated values $\delta_1$ to $\delta_3$ is greater than a predetermined compensated value $\delta3_{max}$ which is lower in value than the value $\delta_{max}$.

19. The method of location as claimed in claim 1, further comprising, for each electronic apparatus (5-8) and after receipt of a first three signals RF1-RF3 furnished by said electronic apparatus:
calculating a maximum angular deviation between the three compensated values $\delta_1$ to $\delta_3$ obtained for each of the r wheel speed sensors (13-16); and
eliminating a group of the first three signals RF1-RF3, and ordering an overall reinitialization of the location procedure when for all the wheel speed sensors (13-16) a maximum deviation between the three compensated values $\delta_1$ to $\delta_3$ is greater than a predetermined compensated value $\delta3_{max}$ which is lower in value than the value $\delta_{max}$.

20. The method of location as claimed in claim 19 further comprising, for each electronic apparatus (5-8) and after receipt of a first two signals RF1-RF2 furnished by said electronic apparatus:
calculating a maximum angular deviation between the two compensated values $\delta_1$ to $\delta_2$ obtained for each of the r wheel speed sensors (13-16),
eliminating the first two signals RF1,RF2,
and ordering an overall reinitialization of the location procedure when for all the wheel speed sensors (13-16) a deviation between the two compensated values $\delta_1$ to $\delta_2$ is greater than a predetermined value $\delta2_{max}$ which is lower in value than the predetermined compensated value $\delta3_{max}$.

* * * * *